US012624629B2

(12) United States Patent
DiFoggio et al.

(10) Patent No.: US 12,624,629 B2
(45) Date of Patent: May 12, 2026

(54) ADJUSTABLE GAS SPRING TUNED MASS DAMPER

(71) Applicant: Baker Hughes Oilfield Operations, LLC, Houston, TX (US)

(72) Inventors: Rocco DiFoggio, Houston, TX (US); Christian Fulda, Celle (DE)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 0 days.

(21) Appl. No.: 18/777,095

(22) Filed: Jul. 18, 2024

(65) Prior Publication Data

US 2025/0027401 A1 Jan. 23, 2025

Related U.S. Application Data

(60) Provisional application No. 63/514,498, filed on Jul. 19, 2023.

(51) Int. Cl.
E21B 44/00 (2006.01)
E21B 3/04 (2006.01)
(Continued)

(52) U.S. Cl.
CPC .......... E21B 44/00 (2013.01); E21B 41/0085 (2013.01); F16F 15/002 (2013.01); F16F 15/1414 (2013.01); F16F 15/161 (2013.01); E21B 3/04 (2013.01); E21B 47/07 (2020.05); F16F 2222/08 (2013.01); F16F 2222/126 (2013.01); F16F 2228/066 (2013.01); F16F 2230/0047 (2013.01); F16F 2230/08 (2013.01); F16F 2230/18 (2013.01)

(58) Field of Classification Search
CPC ........ E21B 44/00; E21B 41/0085; E21B 3/04; E21B 47/07; E21B 17/07; F16F 15/002; F16F 15/1414; F16F 15/161; F16F 2222/08; F16F 2222/126; F16F 2228/066; F16F 2230/0047; F16F 2230/08; F16F 2230/18
See application file for complete search history.

(56) References Cited

U.S. PATENT DOCUMENTS

| | | | | |
|---|---|---|---|---|
| 3,746,329 | A | * | 7/1973 | Galle ...................... F16F 9/067 |
| | | | | 267/125 |
| 4,210,316 | A | * | 7/1980 | Hall ........................ E21B 17/07 |
| | | | | 267/125 |

(Continued)

*Primary Examiner* — Yanick A Akaragwe
(74) *Attorney, Agent, or Firm* — Bracewell LLP; Keith R. Derrington

(57) ABSTRACT

Vibration in a drill string is damped with a damping system coupled to the drill string. The damping system includes a chamber, a gas and piston in the chamber, and a mass connected to the piston. The gas defines a spring having a spring coefficient that is dependent on a volume or temperature of the chamber. The damping system is tunable in real-time by varying the volume or temperature of the chamber. In alternatives with multiple chambers interconnected to one another via ports, chamber volume at the existing pressure can be varied by selective actuation of valves between the chambers or the pressure of the gas can be varied by compressing or expanding a connected bellows or by heating or cooling the temperature of the gas. The damping system can selectively damp both radial and torsional vibrations.

20 Claims, 5 Drawing Sheets

(51) Int. Cl.

| | |
|---|---|
| *E21B 41/00* | (2006.01) |
| *E21B 47/07* | (2012.01) |
| *F16F 15/00* | (2006.01) |
| *F16F 15/14* | (2006.01) |
| *F16F 15/16* | (2006.01) |

(56) References Cited

U.S. PATENT DOCUMENTS

| | | | | |
|---|---|---|---|---|
| 4,402,495 A | * | 9/1983 | Dyer | E21B 17/07 267/125 |
| 4,428,443 A | * | 1/1984 | Oliphant | E21B 17/07 175/321 |
| 5,133,419 A | * | 7/1992 | Barrington | F16F 9/06 166/242.7 |
| 5,476,421 A | * | 12/1995 | Moore | F16D 3/76 464/96 |
| 6,681,908 B2 | | 1/2004 | Davis | |
| 10,273,761 B2 | * | 4/2019 | SadAbadi | E21B 17/04 |
| 2009/0035069 A1 | | 2/2009 | Krehbiel et al. | |
| 2010/0263934 A1 | * | 10/2010 | Nielsen | E21B 17/07 175/113 |
| 2014/0151122 A1 | | 6/2014 | Venugopal et al. | |
| 2014/0238662 A1 | | 8/2014 | Prieto | |
| 2020/0018124 A1 | | 1/2020 | Hohl | |
| 2020/0018377 A1 | | 1/2020 | Hohl et al. | |
| 2021/0301646 A1 | * | 9/2021 | He | F16F 15/08 |
| 2023/0009235 A1 | | 1/2023 | Kulke et al. | |

* cited by examiner

ADJUSTABLE GAS SPRING TUNED MASS DAMPER

CROSS-REFERENCE TO RELATED APPLICATION

This application claims priority to and the benefit of U.S. Provisional Application Ser. No. 63/514,498, filed Jul. 19, 2023, the full disclosure of which is incorporated by reference herein in its entirety and for all purposes.

BACKGROUND OF THE INVENTION

1. Field of Invention

The present disclosure relates to a wellbore drilling system that includes a drill string equipped with a damping system having a gas spring that is tunable in real-time.

2. Description of Prior Art

Drilling systems employed for excavating hydrocarbon producing wellbores in a subterranean formation, and which typically include a drill string made up of a pipe string, a drill bit, and a collar connecting the drill bit to the pipe string. The pipe string is generally made up of joints of drill pipe connected in series by engaging threads on their opposing ends. Usually, the drill string is rotated by a top drive or rotary table provided in a drilling rig on surface while drilling mud is circulated within the drill string to remove cuttings formed by rotating the drill bit in the formation.

Reactive forces from the bit rotating against the subterranean rock formations generate vibrations of the drill string. Depending on the forces and physical characteristics of the drill string and the formation, the vibrations are in directions that are radial, torsional, axial, and combinations. Recent advancements in drilling technology have increased rates of penetration through the formation as well as weight on bit, and in turn increased magnitudes of vibrational displacement, force, and/or acceleration in drill strings, thereby increasing a probability of damaging the drill string and its subcomponents, such as electronics, actuators or pumps, and/or power storage devices such as batteries or capacitors. Vibrational frequencies often encountered during drilling range from about 50 Hz to greater than 500 Hz. One approach to counter the effect of drill string vibrations is use of a tuned mass damper. Tuned mass dampers usually include a small mass, a spring, and a damper attached to a larger mass whose vibrations are being damped. The small mass typically weighs less than the object, and its oscillation frequency is tuned to be substantially similar to the resonant frequency of the larger mass that is being damped. One drawback with presently known systems for damping vibrations in drill strings is the inability to provide damping over the broad spectrum of vibrational frequencies. Drill string damping is important because vibrations can cause the bit to bounce against the sides or bottom of the bore hole resulting in premature failure of the bit or drill string as well as low rates of drilling penetration.

SUMMARY OF THE INVENTION

Disclosed herein is an example of a method of operations in a wellbore that includes rotating a drill string in the wellbore, monitoring the vibrations of the drill string, and damping those vibrations, in part, by compressing a gas.

Optionally, the volume, and therefore the effective spring coefficient, of the gas, which is the basis of the gas spring, is adjusted based on a frequency of the vibrations of the drill string. Note that, even when the gas pressure in all the chambers is the same, actuating valves between these chambers to change total connected gas volume, changes the effective spring coefficient because it changes the rate at which the pressure changes with volume. Optionally, the pressure of the gas in the gas spring (and corresponding gas spring coefficient) is varied by varying the volume of a connected flexible bellows. Optionally, the pressure of the gas in the gas spring (and corresponding gas spring coefficient) is varied by varying the temperature of the gas in the gas spring through heating or cooling of the gas. In the hot downhole environment, resistive heating of the gas above borehole temperature is much easier to engineer than trying to cool the gas below borehole temperature. In an example, radial, axial, and torsional vibrations are being damped. Varying an amount of the gas alternatively includes adjusting a volume of a vessel containing the gas. In an embodiment, the vessel includes multiple chambers and valves between the chambers, the method further includes that when, in an open configuration, there is communication between the chambers, and when, in a closed configuration, communication is blocked between the chambers. The valves are optionally actuated with an actuator, such as a stack piezo actuator, a piezo linear actuator, an electroactive polymer, an electrostrictive polymer, and combinations. The valves can be as simple as a sliding valve over a small, one-millimeter diameter orifice to permit rapid opening and closing of that valve within a fraction of a second for real-time control. The gas is optionally included in a damping system that includes a vessel in which the gas is contained and that is coupled with the drill string, a piston that moves within the vessel in response to the vibration of the drill string and that compresses the gas in the vessel, a mass coupled with the piston, and chambers within the vessel that are in communication with other chambers in the vessel through passages, the method of this example further includes monitoring the frequency of vibration of the drill string to obtain a monitored frequency of the drill string, adjusting a resonant frequency of the damping system to be close to or substantially the same as the dominant monitored frequency of the drill string. In alternatives, adjusting a resonant frequency of the damping system includes changing a volume of the gas being compressed by the piston by selectively controlling communication through the passages.

Also disclosed is a system for wellbore operations, and that includes a drill string that is selectively rotated in the wellbore, and a damping system for damping vibrations of the drill string. In this example, the damping system includes a vessel coupled with the drill string and that is in selective reciprocating movement with vibration of the drill string, the vessel having chambers and passages interconnecting the chambers, a gas contained in the chambers, a piston slidable in a portion of the vessel and in compressive contact with the gas in response to the reciprocating movement of the vessel, and valves in the passages that are changeable between open and closed configurations, so that when one of the valves is moved between an open and closed configuration a volume of the vessel is changed to alter a resonant frequency of the damping system to be close to or substantially equal to a designated frequency. The piston is optionally slidable in a direction radial to an axis of the drill string, or transverse to the axis. In an example, the vessel is a first vessel and the piston is a first piston, the system further including a second vessel and a second piston slidably disposed in the second vessel. In another example, the vessel is a first vessel, the piston is a first piston, and the system further includes a second vessel and a second piston slidably disposed in the second vessel. A mass is optionally coupled to the first and second pistons, the mass having an amount of inertia selected for damping vibrations of the drill string. An actuator is optionally coupled with one or more of the valves and is one or more of a stack piezo actuator, a piezo linear actuator, an electroactive polymer, an electrostrictive polymer, or combinations. A processor is optionally included for determining an estimated volume of the vessel that results in the system having resonant frequency that is substantially the same as the designated frequency, and that controls one or more of the actuators to adjust the volume of the vessel to be substantially the same as the estimated volume. Examples of the system include an accelerometer for estimating vibration frequencies of the drill string.

BRIEF DESCRIPTION OF DRAWINGS

Some of the features and benefits of the present invention having been stated, others will become apparent as the description proceeds when taken in conjunction with the accompanying drawings, in which.

Figure 2:
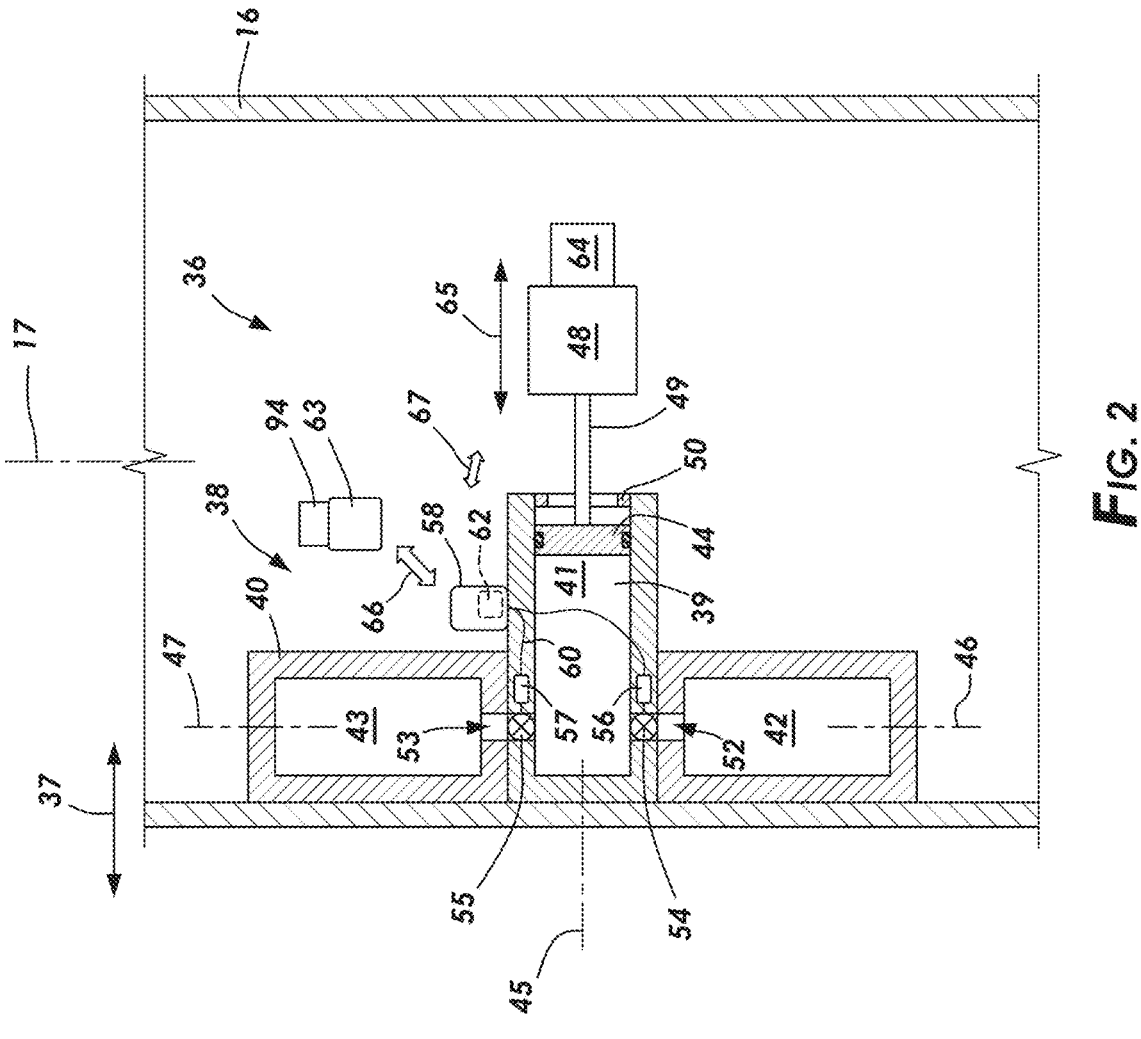
FIGS. 2-4 are side partial sectional views of examples of damping systems for use with the drilling system of FIG. 1.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes within a predefined range such as within an absolute range or a relative range (e.g., +/−5% of a cited magnitude, comparison, or description). In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Disclosed herein is an example of a tuned mass damper for a drill string having a gas spring; where the gas spring includes a gas contained within multiple chambers that are connected by valves that can be rapidly opened or closed to change the total volume of gas in the gas spring and, thereby, change the effective spring coefficient of the gas spring. In an alternative, to achieve a maximum effect the small mass in the damper is set to move at the same vibrational frequency as the drill string to which it is attached, but at 180 degrees out of phase with the dominant drill string vibrational frequency. Accelerometers optionally are placed on both the small mass and the drill string, and their responses compared. In an example, a controller, such as a proportional, integral, and derivative ("PID") controller is used to adjust the effective spring coefficient of the gas spring to achieve its maximum effect.

Figure 1:
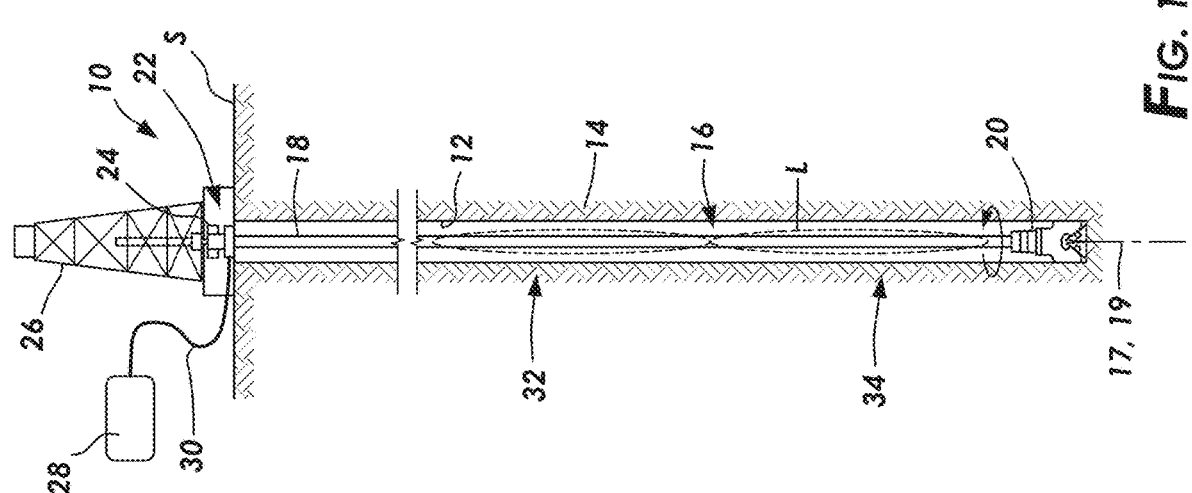
FIG. 1 is a side partial sectional view of an example of excavating in a wellbore with a drilling system.

Illustrated in a partial side sectional view in FIG. 1 is an example of a drilling system 10 forming a wellbore 12 through a subterranean formation 14. The drilling system 10 includes a drill string 16 shown inside wellbore 12, drill string 16 has a longitudinal axis 17 and includes a pipe string 18 with a longitudinal axis 19 and drill bit 20 mounted on its lower end. On surface S is a rotary table 22 which provides rotational force onto the drill string 16 to rotate drill bit 20 against the bottom of wellbore 12 and to excavate through formation 14. Further shown in the example of FIG. 1 is a wellhead assembly 24 over the opening of wellbore 12 and that provides pressure control of wellbore 12 as well as means for accessing wellbore 12. Mounted over the wellhead assembly 24 on surface S is a derrick 26, which provides support for the drilling operations such as raising and lowering individual pipe joints of the drill string 16 and supporting the drill string 16 inside the wellbore 12. A controller 28 is schematically illustrated in communication with equipment downhole via communication means 30. In the example of FIG. 1, rotation of drill string 16 is generating vibrations in sections 32, 34 of drill string 16, which are schematically illustrated by dashed lines L. In examples, these vibrations are in a direction parallel with longitudinal axis 17 of drill string 16 (i.e., axial vibration), radial to longitudinal axis 17 of drill string 16 (i.e., lateral vibration), or transverse to longitudinal axis 17 of drill string 16, such as circumferential about longitudinal axis 17 of drill string 16 (i.e., torsional vibration), or a combination thereof.

Shown in a side partial sectional view in FIG. 2 is an example of a damping system 36 mounted to or in operational contact with an inner sidewall of drill string 16; and in the illustrated example provides damping for radial motion of sidewalls of drill string 16, which is depicted by arrow 37. Damping system 36 of FIG. 2 includes a reservoir 38 having a gas 39 contained and sealed within. Non-limiting examples of the gas 39 include nitrogen, oxygen, air, inert gases, helium, neon, argon, etc., and combinations thereof. Reservoir 38 includes a housing 40 in which chambers 41, 42, 43 are formed. In the example shown, chambers 41, 42, 43 are elongate and cylindrical, but other shapes such as spherical, prismatic, cubical shapes or irregular spheres are also possible. In examples chambers 41, 42, 43 all have the same volumes, each have different volumes, or only one of the chambers 41, 42, 43 has a different volume. In one embodiment, housings 40 are rigid. In other embodiments, at least portions of housings 40 include elastic material, such as rubber bellows or relatively thin metal bellows. Further optionally, more than three, or less than three chambers are within reservoir 38. As shown, the chambers 41, 42, 43 have axes 45, 46, 47 extending along their respective lengths. In FIG. 2, axis 45 of chamber 41 is generally orthogonal to each of the axes 46, 47 of chambers 42, 43, in alternative embodiments chambers 42, 43 abut chamber 41 at substantially the same location along axis 45 so that axes 46, 47 are substantially parallel with one another. Optionally, chambers 42, 43 abut chamber 41 at different locations along axis 45 so that axes 46, 47 of chambers 42, 43 are offset from one another. In alternative examples, chambers 42, 43 are oriented so that axes 46, 47 of chambers 42, 43 are at different angles to each other. In alternatives, axes 46, 47 of chambers 42, 43 intersect axis 45 of chamber 41 at the same or different locations, including in one or more of the above-described embodiments.

A piston 44 is shown within a portion of chamber 41 distal from where chambers 42, 43 abut chamber 41. Piston 44 is slidable within chamber 41 along axis 45, which in the example of FIG. 2 is in a direction which is radial to longitudinal axis 17 of drill string 16. Further included with the damping system 36 is a mass 48 that connects to a side of piston 44 facing away from chamber 41, and mass 48 and piston 44 that are connected by a piston rod 49. As described in more detail below, an inertia of the mass 48 is selected to counter the vibratory oscillations of drill string 16. Represented by arrow 65 is movement of piston 44 and mass 48 relative to drill string 16, which is responsive to movement of drill string 16. In an example, and when the movement of drill string 16 is at least partially caused by relatively fast vibrations (i.e., relatively small oscillatory, periodic, or statistically distributed movements), mass 48 and piston 44, and thus the momentary volume of chambers 41, 42, 43 is also subject to relatively small oscillatory, periodic, or statistically distributed movements and/or variations. In such cases, in the context of this disclosure, the term "volume", for example "volume" of a chamber, refers to an average volume, for example the average volume of that chamber, where the average is taken over a time period long enough to cover a number of oscillations or periods or a time period long enough to cover a number of such statistically distributed movements and/or variations. A terminal end of chamber 41 includes a backstop 50, which is schematically illustrated as a lip on an inner sidewall of chamber 41 that faces radially inward and interferes with movement of piston 44 to outside of chamber 41.

Still referring to FIG. 2, chambers 41, 42, 43 are interconnected with one another by ports 52, 53 that are formed through portions of housing 40 separating the separate chambers 41, 42, 43. Valves 54, 55 are shown mounted within ports 52, 53 and for providing selective communication between the chambers 41, 42, 43 to control how many of the chambers 41, 42, 43 are connected to one another to create a combined volume. Controlling in this context includes opening or closing valves 54, 55 to allow or prevent gas flow between the chambers 41, 42, 43 and to provide selective communication between them to selectively create a combined volume of connected chambers. Alternatively, or in addition, controlling in this context may also include partially opening valves 54, 55 to increase or reduce gas flow between the chambers 41, 42, 43 to increase or reduce communication/connection between the chambers to selectively create a more or less combined volume. Selectively controlling the connection/communication between chambers 41, 42, 43 provides an advantage of adjusting the spring coefficient of the gas spring while the drill string 16 is in the wellbore 12. Actuators 56, 57 are shown coupled with valves 54, 55, and in an example of operation provide means for moving the valves 54, 55 between opened and closed configurations. A controller 58 is shown in communication with actuators 56, 57 via communication means 60, and in one alternative a power source 62 is included within controller 58 for providing electrical power to controller 58, and/or actuators 56, 57. An accelerometer 63 is shown mounted to the drill string 16 and an accelerometer 64 is shown mounted to mass 48. In an example, accelerometers 63, 64, monitor vibrations respectively of drill string 16 and mass 48, and are in communication with controller 58 via communication means 66, 67.

In a nonlimiting example of operation vibratory motion of drill string 16 (FIG. 1) and as illustrated by arrow 37, causes relative displacement of piston 44 within chamber 42 as the piston 44 is slidable within chamber 42; and similar to a mechanical spring, the gas 39 is compressed in response to piston 44 being displaced in a direction away from backstop 50, and gas 39 expands in response to piston 44 being displaced in a direction towards backstop 50. This combination of the gas 39 contained within chambers 41, 42, 43 of reservoir 38, movement of the piston 44, and attached mass 48, is analogous to a mechanical damping system having a spring with an attached mass. Represented by arrow 65 is a radial movement of piston 44 and mass 48 relative to drill string 16, which is responsive to radial movement of drill string 16. In further analogous examples, the mass 48 coupled to the drill string 16 through the attached piston 44 with the gas 39 on an opposite side generates and exerts a damping force onto drill string 16 in directions that include the same as, oblique to, and opposite the vibratory motion of the drill string 16. As described in more detail below, selectively opening and closing valves 54, 55 by operation of actuators 56, 57, thereby opening/blocking fluid or pressure communication across one or more ports 52, 53 changes the overall volume within reservoir 38 which in turn changes a spring coefficient of the damping system 36. By constantly or repeatedly monitoring the frequency of vibration of the drill string 16 via accelerometer 63 the controller 58 is in one example configured to calculate a resulting volume of the reservoir 38 such that the damping system 36 has a resonant frequency that is the same as or substantially similar or at least closer to the measured frequency of vibration of the drill string 16. In an example of adjusting the resonant frequency, the decision for opening and/or closing one or more of valves 54, 55 is determined with controller 58 and resulting commands are delivered to actuators 56, 57 so that a volume within reservoir 38 is achieved so the damping system 36 has a designated resonant frequency. An advantage of this system is that it is a real-time tunable damping system, which operates to counter vibrations that occur over a large spectrum of frequencies, such as but not limited to 50 hertz to 500 hertz (e.g., high-speed torsional vibrations).

Figure 3:
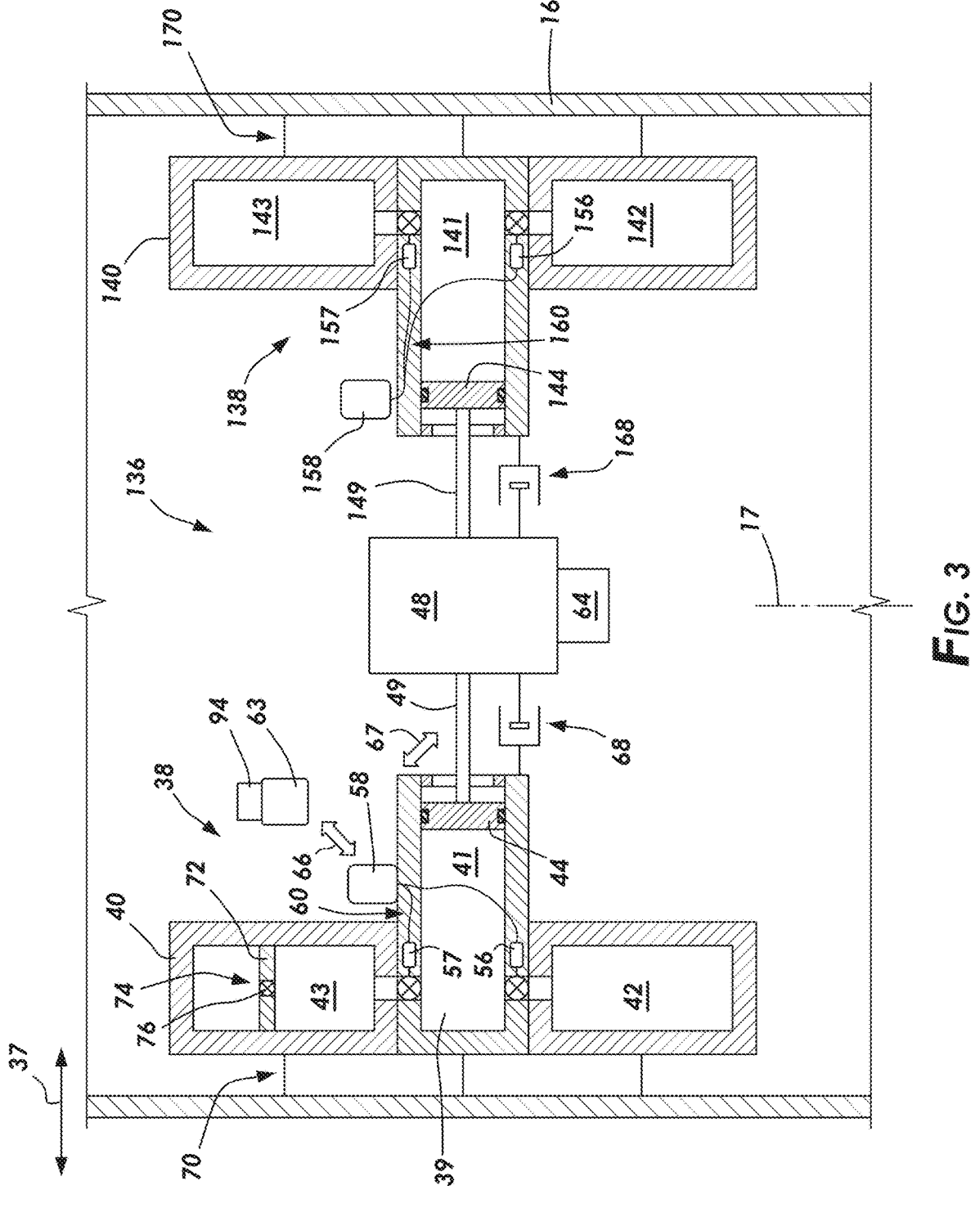
Figure 4:
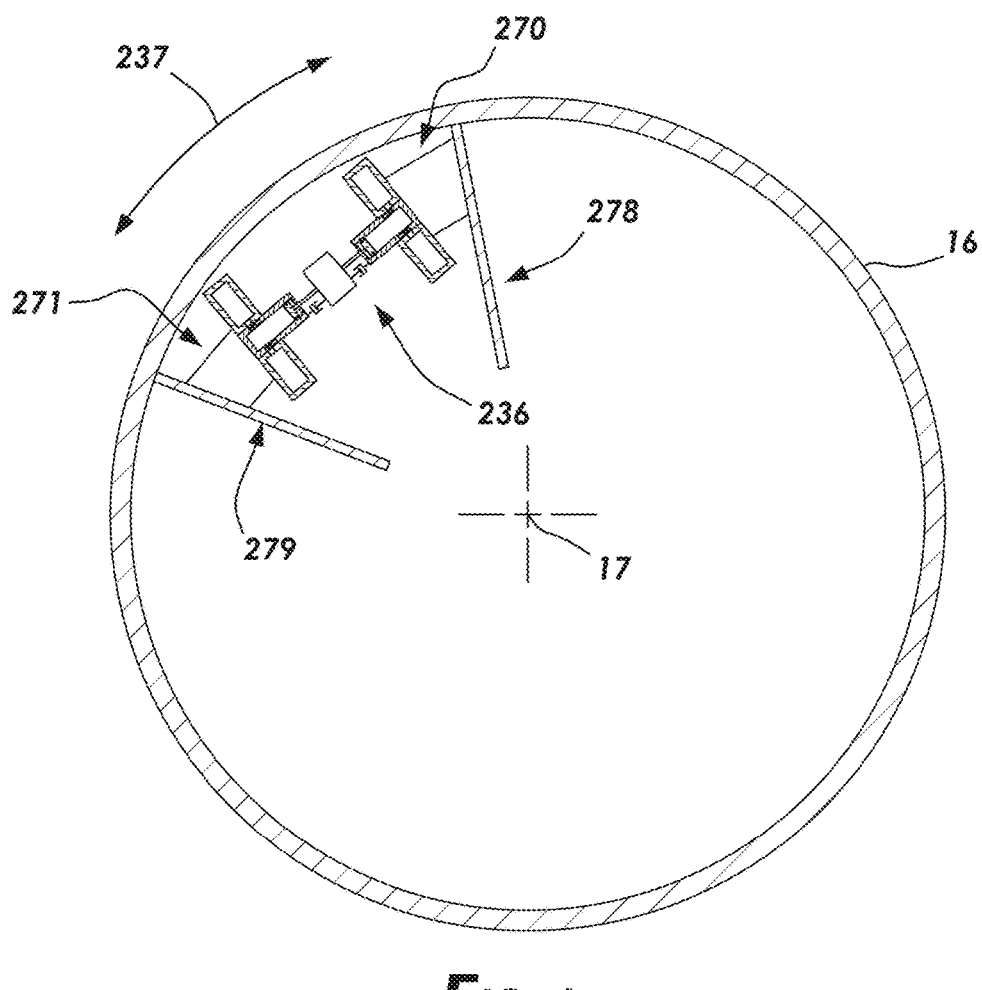

An alternate embodiment of a damping system 36 is shown in a side sectional view in FIG. 3. In this example, damping system 136 is inside the drill string 16, such as in an annulus of drill string 16 and includes first and second reservoirs 38, 138 shown spaced angularly apart from one another and mounted to an inner sidewall of drill string 16. Controllers 58, 158 are shown in communication with actuators 56, 57, 156, 157 via communication means 60, 160, and in one alternative, one or more power sources are included within controllers 58 and/or 158 for providing electrical power to controllers 58, 158 and/or actuators 56, 57, 156, 157. Accelerometer 63 is shown mounted to the drill string 16, and accelerometer 64 is shown mounted to mass 48. In an example, accelerometers 63, 64, monitor vibrations respectively of drill string 16 and mass 48 and are in communication with controllers 58, 158 via communication means 66, 67. Reservoir 138 is substantially similar to reservoir 38 of FIG. 2, but in the example of FIG. 3, dashpots 68, 168 are coupled between mass 48 and respective housings 40, 140 of reservoirs 38, 138. In a non-limiting example, dashpots 68, 168 each include a fluid-filled cylinder with a piston reciprocating within to create a drag force, a thrust, or a shear force in response to the motion of mass 48 relative to drill string 16 in reciprocating directions. Further in the example of FIG. 3 are bracket assemblies 70, 170 and which couple the reservoirs 38, 138 to drill string 16, such as to opposing inner sidewalls of drill string 16. Similar to the example of FIG. 2, movement of sidewalls of drill string 16 relative to subterranean formation 14, as represented by arrow 37, and generates respective movement and displacement of the reservoirs 38, 138 relative to mass 48 and pistons 44, 144 and thereby pressing gas 39 within chambers 41, 42, 43, 141, 142, 143 of the two reservoirs 38, 138. As shown, pistons 14, 144 are respectively coupled to mass 48 by piston rods 49, 149. Further shown in FIG. 3 is an optional wall 72 that spans the cross-section of chamber 43 and which includes a port 74 and a valve 76. In a non-limiting example, an actuator (not shown) provides opening and closing ability for valve 76 thereby providing additional flexibility for changing the volume within reservoir 38. In the examples of FIGS. 2 and 3, the vibratory motion represented by arrow 37 is in a direction radial to longitudinal axis 17 of drill string 16. In examples, the arrangement is similarly used to dampen axial vibrations with the damping system 136 in a way that mass 48 and pistons 44, 144 move relative to drill string 16 parallel to longitudinal axis 17 of drill string 16. Referring now to FIG. 4, shown as an example of damping motion in a torsional direction illustrated by arrow 237. In this example, supports 278, 279 are shown that project radially inward from sidewalls inside of drill string 16 and towards longitudinal axis 17 of drill string 16. An example of damping system 236 is mounted with brackets 270, 271 to the supports 278, 279 and that provide a damping counterforce to torsional vibration in the direction of arrow 237.

Figure 5:
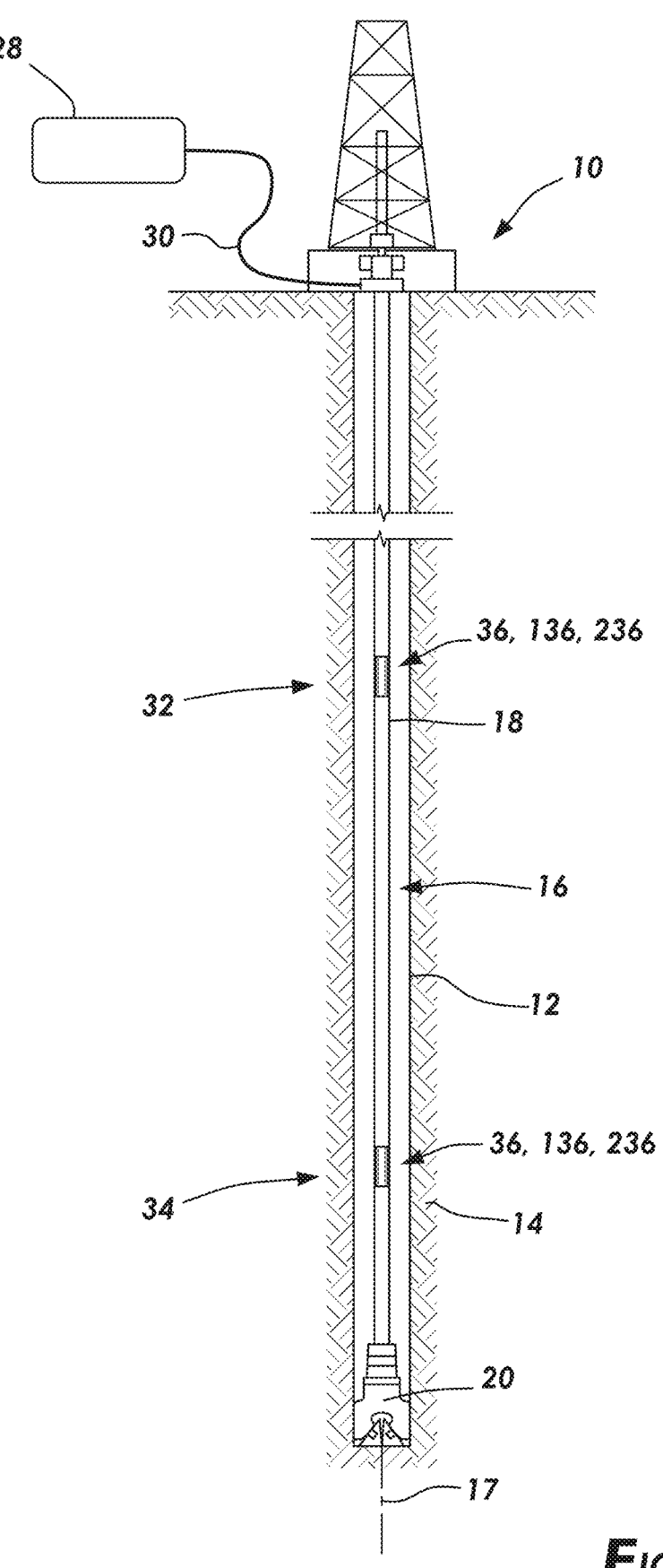
FIG. 5 is a side partial sectional view of an example of the drilling system of FIG. 1 having one or more of the damping systems of FIGS. 2-4.

Referring now to FIG. 5, shown in a side partial sectional view is an example of drilling system 10 that is equipped with at least one of the damping systems 36, 136, 236 disposed in one or both sections 32, 34. In the illustration, the drill string 16 is rotating and exerting a force against the bottom of wellbore 12, however, the incorporation of the damping systems 36, 136, 236 within one or more sections 32, 34 of drill string 16 dampens the vibratory motion so that the high-speed torsional oscillations experienced by the drill string 16 shown in FIG. 1 are decreased, dampened, muted, and/or removed to avoid the damaging effects of these vibrations.

In alternatives, valves 54, 55 include miniature gas valves, such as solenoid or sliding gate valves, and electrical power to operate these valves, the PID, and other electronics is provided by energy harvesting (such as from the vibration itself and that also generates some damping), power generation devices (such as those including turbines) and/or power storage devices (e.g., batteries and/or capacitors) alone or in combination. Example actuators include a stack piezo actuator or a piezo linear actuator, which can move in a fraction of a second over their 50 to 1000 microns range for a similar size orifice. PI Ceramic GmbH, Lindenstraße, 07589 Lederhose, Germany, https://www.piceramic.com/. Example dampers are available from Northeast Controls Inc., PO Box 9, Nassau, DE19969, Tel: (201) 419-6111, sales@peecoflowswitch.com.

Gas Spring Coefficient

From the ideal gas laws, for an ideal-gas-filled chamber of arbitrary shape and total volume, V:

$$PV = nRTP \text{ so } P = nRT/V \tag{1}$$

Where:
P=absolute pressure of the gas;
V=volume of the gas;
n=moles of the gas;
R=ideal gas constant of the gas; and
T=absolute temperature of the gas.

If this volume terminates in a cylinder having a fitted piston of area (A) pushing against a backstop, then the force (F) on this piston is, $$F = PA = nRTA/V \tag{2}$$

The gas filled cylinder with a piston forms a gas-filled spring, which has a nonlinear dependence of force as a function of piston displacement away from the backstop, i.e., movement of the piston in a direction that compresses the gas in the cylinder. A gas filled spring therefore does not follow Hooke's law: F=−kx that is used to model the behavior of linear mechanical springs, where the minus sign is used to indicate that the restoring force, F, is in the opposite direction of the displacement, x, which makes k a positive number whereas F and x are signed. However, for small displacements, dx, of the piston from the backstop, the gas spring behaves similar to a linear spring; and, over these small displacements, behavior of the gas spring can be modeled with an "effective" spring coefficient ($k_{eff}$=−dF/dx). For one mole (28 g) of Nitrogen gas at 25° C. and 100 bar, which occupies a volume of 246 ml, a small displacement of a one square inch piston would mean a displacement of about a third of a millimeter. Applying calculus to Equation 2, we then obtain the following expressions where dV=A (−dx):

$$dF = -\left(nRTA/V^2\right)(dV) \tag{3}$$

$$dF = -\left(nRTA/V^2\right)(Adx) \tag{4}$$

$$k_{eff} = -dF/dx = \left(nRTA^2/V^2\right) \tag{5}$$

The effective spring coefficient $k_{eff}$ is adjustable with changes in area A of the piston or changes of the volume V of the cylinder. Note that the change in pressure, dP=dF/A, which makes the rate of change of pressure with volume, dP/dV=nRT/V²=$K_{eff}$/A, from Equations 3 and 5.

In an example of adjusting the effective spring coefficient $k_{eff}$, with changes in volume V of the cylinder, $V_0$ represents an initial volume of the cylinder and the gas filled cylinder has a corresponding initial effective spring coefficient $k_{eff\,0}$. Decreasing the initial volume $V_0$ by a factor M to a compressed volume $V_1$ results in an adjusted effective spring coefficient $k_{eff\,1}$ that is equal to the product ($k_{eff\,0}$) (M²). Note the factor of the square of M. For example, reducing the volume by a factor of 3 makes the effective spring coefficient 9 times stiffer. These changes in connected gas volume can be done very quickly just by opening or closing (that is, actuating) valves between the chambers.

EXAMPLE

In a non-limiting example based on NIST Chemistry WebBook data and applying equations (1)-(5) above, a cylinder containing one mole (28 grams) of Nitrogen at a temperature of 25° C. and a pressure of 100 atmospheres (1469.59 pounds per square inch absolute ("psia")), is compressed from an initial volume $V_0$ to a compressed volume $V_1$ by movement of a piston to a pressure of 100.1 atmospheres (1471.06 psia). Assuming the piston area A is one square inch, then $k_{eff}=-F/\Delta x=-PA/\Delta x=PA/(\Delta V/A)=PA^2/\Delta V=15,684$ lb/in=2,747 N/mm. These values of spring coefficient are consistent with shock absorbing systems employed in drilling operations, such as those provided by Dynomax Drilling Services, 7501 42 Street Leduc, Alberta T9E 0R8, Canada 780.986.3070. Provided in Eqn. 5 above is that a spring coefficient for a gas spring depends on temperature, and has a different response when subjected to different temperatures; such as in a wellbore 12 in which temperature can range from below 330° K to in excess of 430° K. For an ideal gas, the pressure increases linearly with increasing absolute temperature, so a gas spring becomes stiffer at a higher gas temperature. In one example, temperature changes of the damping system 36 are accounted for by adjusting an original volume inside the chamber(s) 41, 42, 43 so that, if under conditions in the wellbore 12 require moving piston 44 to have an adjusted volume, the damping system 36 has adequate capacity to accommodate the adjusted volume.

Figure 6:
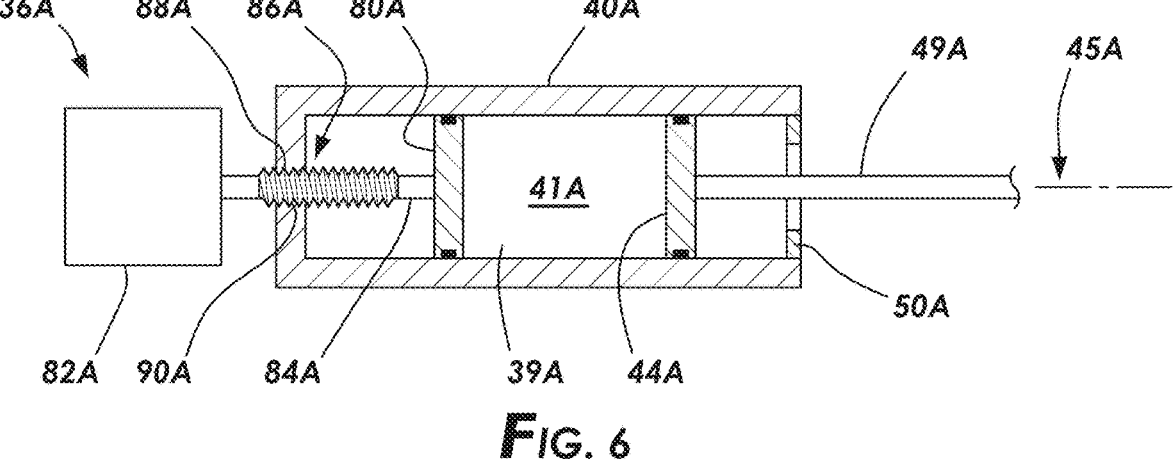
FIG. 6 is a schematic example of an alternate embodiment of a portion of the damping system of FIGS. 2-4.

Schematically illustrated in FIG. 6 is a portion of an alternate embodiment of a damping system 36A having a sizing piston 80A inside chamber 41A, and that couples with a motor 82A. A rod 84A extends from motor 82A and connects to a side of sizing piston 80A opposite piston 44A. Piston rod 49A attaches to a side of piston 44A opposite sizing piston 80A and projects through backstop 50A. A gas 39A is in chamber 41A between piston 44A and sizing piston 80A. Rod 84A projects through an opening 86A formed axially through an end wall of housing 40A opposite backstop 50A. In a non-limiting example, motor 82A is selectively energized with electricity from an electrical source (not shown) to move rod 84A along axis 45A, and in turn urges attached sizing piston 80A axially within chamber 41A. In an alternative, threads 88A, 90A are provided along rod 84A and opening 86A respectively, and energizing motor 82A creates rotation of rod 84A, the rotation is converted to linear motion by interaction of the threads 88A 90A.

Note that preloading a compressional coil spring does not alter its spring coefficient k (i.e., the rate at which that force increases with increasing compression). In an example having a preload force, $F_0$, the compression spring equation is, $F-F_0=kx$ and, therefore, $dF/dx=k$, and as it was without preloading. Likewise, preloading a torsional coil spring does not change its spring coefficient (i.e., the rate at which that torque increases with increasing angle of rotation). One way to change the spring coefficient of a coil spring is to change the number of active coils by clamping a mid-portion of a coil spring, which if to be performed in real-time introduces complications over that of providing selective communication between chambers containing gas, and as disclosed herein. In an example, the effective spring coefficient of a gas spring is changed by changing the total volume of connected gas space in the spring before or while deploying that gas spring in a well so as to match the expected or measured vibrational frequency of the drill string downhole.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. In alternatives, one or more of controllers 28, 58, and 158 is an information handling system ("IHS"). In an example, an IHS is employed for controlling the generation of the acoustic signal herein described as well as receiving the controlling the subsequent recording of the signal(s). In an alternative, the IHS stores recorded data as well as processing the data into a readable format. The IHS is optionally disposed at the surface, in the wellbore, or partially above and below the surface. In embodiments, the IHS includes a processor, memory accessible by the processor, nonvolatile storage area accessible by the processor, and logics for performing each of the steps described herein. Example communication means 30, 60, 66, 67 include hardwire, fiber optics, wireless, telemetry, and other known and later developed ways of communicating signals, such as on surface, within wellbore 12, and between surface and wellbore 12.

Figures 7A, 7B:
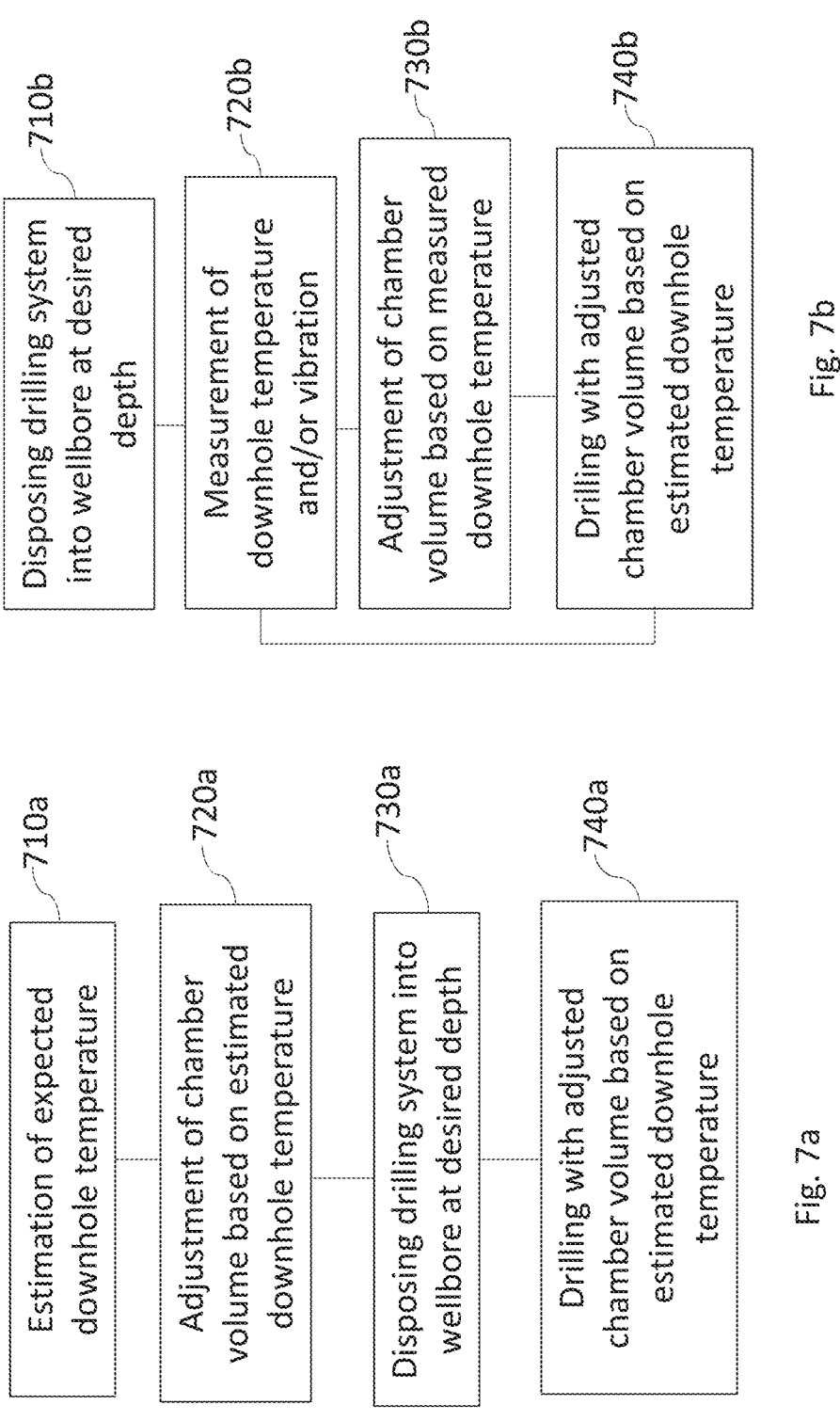
FIGS. 7a and 7b are flow diagrams having depictions of example methods for excavating with a drilling system.

In another alternative, measures are undertaken to compensate for variations of the spring coefficient of the gas caused by changes in temperature. Illustrated in Equations (1)-(5) above, a spring coefficient of an ideal gas varies linearly with changes in temperature. Examples of compensation include adjusting the volume(s) of one or more of chambers 41, 42, 43, 141, 142, 143; where the adjustment in volume(s) is pre-adjusted on surface before deploying the damping system(s) 36, 136 downhole and based on anticipated temperatures in the wellbore 12 to ensure accurate spring stiffnesses at the expected temperature downhole. Illustrated in FIG. 7a is an example process having steps 710a-740a to drill at least a portion of a wellbore with a pre-adjusted damping system (such as damping systems 36, 136 in FIGS. 2 and 3). As shown, step 710a includes estimation of a downhole temperature at a depth or depth range where the portion of the wellbore is to be drilled. In an example, the downhole temperature at the depth or depth range where the portion of the wellbore is to be drilled is estimated based on data from an offset well or from an empiric relationship between depth and temperature. In step 720a of this example, the volume of one or more of chambers in a damping system (e.g., chambers 41, 42, 43, 141, 142) is adjusted based on the estimated downhole temperature at the depth where the portion of the wellbore is to be drilled. The chamber volume will be adjusted so that the damping system is substantially at or close to the resonance frequency at the estimated downhole temperature at the depth or depth range where the portion of the wellbore is to be drilled. In alternatives, adjustment of a chamber volume is done by installing optional wall 72 in chamber 43 at a desired position, by moving sizing piston 80A at a desired position (for example by rotating threads 88A relative to threads 90A thereby moving rod 84A and sizing piston 80A), for example by motor 82A or manually, or by opening one or more of valves 54, 55, 76 (manually or by actuators 56, 57 for example). In step 730a, after adjustment of the chamber volume based on the estimated downhole temperature, the drilling system is disposed into the wellbore to a desired depth. In step 740a, drilling of at least the portion of the wellbore optionally will take place with the adjusted chamber volume and the damping system that is substantially at or close to the resonance frequency at the estimated downhole temperature at the depth or depth range where the portion of the wellbore is drilled. Similarly, an example of adjustment of the chamber volume(s) of one or more of chambers 41, 42, 43, 141, 142, 143 is performed downhole—for example in real-time-by an actuator-driven arrangement (for example, an actuator system comprising motor 82A, threads 88A, 90A, rod 84A, and sizing piston 80A as discussed with respect to FIG. 6). For example, illustrated in FIG. 7b is another example process with steps 710b-740b to drill at least a portion of a wellbore with an adjusted damping system based on a measured downhole temperature. As shown, in step 710b, the drilling system is disposed into the wellbore to a desired depth. In example step 720b the downhole temperature is measured at the depth or close to the depth of the drilling system. The downhole temperature is optionally measured by a temperature sensor 94 that is near or within the damping system 36 as shown in FIGS. 2 and 3. Alternatively, or in addition, a vibration parameter such as an amplitude (e.g., an amplitude of an acceleration, velocity or displacement) or a frequency is measured, for example by accelerometer 63. In example step 730b, the volume of one or more of chambers in a damping system (e.g., chambers 41, 42, 43, 141, 142) is adjusted based on the measured downhole temperature and/or measured vibration parameter. The chamber volume is adjusted so that the damping system is substantially at or close to the resonance frequency at the measured downhole temperature and/or vibration parameter. In an example, adjustment of a chamber volume is done by moving sizing piston 80A to a desired position (for example by rotating threads 88A relative to threads 90A with motor 82A thereby moving rod 84A and sizing piston 80A), or by opening one or more of valves 54, 55, 76 (by actuators 56, 57 for example). The adjustment of the chamber volume in the example of step 730b is done automatically, for example by controlling motor 82A, valves 54, 55, 76 and/or actuators 56, 57 by controller 58 or by a human operator based on communicated information related to the measured temperature and/or vibration parameter. In example step 740b, drilling of at least the portion of the wellbore takes place with the adjusted chamber volume and the damping system that is substantially at or close to the resonance frequency at the measured downhole temperature or vibration parameter. Steps 720b, 730b, and 740b are optionally performed repeatedly at a desired rate for a continuous or repeated monitoring and adjustment of the damping system.

For example, one could use a compressible bellows for one of the chambers. The bellows volume could be set once at the surface, or it could be adjusted in real-time downhole. This approach also eliminates the need to add or remove moles of gas from a closed system. A more complicated approach would be to place a computer-controlled heating element within the final gas chamber that acts as the spring for the tuned mass damper. Raising the temperature of the gas within that chamber would make the gas spring stiffer. By using a high thermal conductivity, but low heat capacity gas, such as helium, the gas could be heated quickly above wellbore temperature, and the gas would also cool rapidly back to wellbore temperature once the heater was turned off. This approach would allow rapid, real-time variation of the gas spring stiffness and allow dynamically varying the frequency of the tuned mass damper to match that of the drill string. To facilitate rapid gas cooling after heating, the chamber, itself, could be made of a high thermal conductivity metal such as copper or aluminum and be immersed in a high operating temperature, high thermal conductivity liquid such as Therminol-66, which is in thermal communication with the wellbore fluid. In principle, the gas in the gas spring could be cooled below wellbore temperature to change its stiffness but that is significantly more difficult to engineer than resistance heating. These and other similar modifications will not readily suggest themselves to those skilled in the art, and are intended to be encompassed within the spirit of the present invention disclosed herein and the scope of the appended claims.

What is claimed is:

1. A method of drilling a wellbore into a subterranean formation, the method comprising:
   rotating a drill string in the wellbore;
   damping vibrations of the drill string with a damping system in the drill string, the damping system comprising a gas spring having a spring coefficient; and
   adjusting, while the drill string and the damping system is in the wellbore, the spring coefficient in response to one or more drilling parameters.

2. The method of claim 1, wherein the gas spring comprises gas in a first chamber having a first volume and wherein the spring coefficient is adjusted in response to a monitored vibration parameter by changing the first volume of the first chamber to a particular volume in real-time.

3. The method of claim 1, wherein the drill string comprises an actuator configured to adjust the spring coefficient while the drill string is in the wellbore.

4. The method of claim 1, wherein the gas spring comprises a first chamber having a first volume and a second chamber having a second volume, and wherein the method further comprises adjusting the spring coefficient by controlling a valve between the first chamber and the second chamber.

5. The method of claim 1, wherein the gas spring further comprises a dashpot, the dashpot configured to damp the vibrations of the drill string.

6. The method of claim 1, further comprising monitoring the drill string vibrations in real-time, wherein the gas spring comprises gas in a chamber and wherein the spring coefficient is adjusted in response to the monitored vibrations by changing a volume of the chamber to a particular volume.

7. The method of claim 6, further comprising measuring a vibration parameter related to the vibrations of the drill string, wherein the one or more drilling parameters comprise the vibration parameter.

8. The method of claim 7, wherein the vibration parameter is one of a frequency of the vibrations and an amplitude of the vibrations.

9. The method of claim 7, wherein the vibration parameter is a frequency of the vibrations and wherein the volume of the chamber is changed so that a resonant frequency of the gas spring is substantially similar to the frequency of the vibrations.

10. The method of claim 1, wherein the drill string further comprises a controller operatively connected to the gas spring, further comprising harvesting energy from the vibrations of the drill string to power the controller to adjust the spring coefficient in response to the one or more drilling parameters.

11. A drilling system for drilling a wellbore into a subterranean formation, the drilling system comprising:
   a drill string configured to rotate within the wellbore; and
   a damping system in the drill string for damping vibrations of the drill string, the damping system comprising,
      a mass configured to move relative to the drill string in response to the vibrations;
      a gas spring connected to the mass and the drill string, the gas spring having a spring coefficient that is adjustable in response to one or more drilling parameters while the drill string and the damping system are in the wellbore.

12. The drilling system of claim 11, wherein the gas spring comprises a first chamber having a first volume and wherein the spring coefficient is adjusted by adjustment of the first volume so that a resonant frequency of the gas spring is substantially similar to a frequency of vibration of the drill string.

13. The drilling system of claim 12, wherein the damping system comprises an actuator configured to adjust the first volume while the drill string is in the wellbore.

14. The drilling system of claim 11, wherein the gas spring comprises:

a first chamber having a first volume; and a second chamber having a second volume; and a valve configured to control communication between the first chamber and the second chamber, wherein the spring coefficient is adjusted by operating the valve.

15. The drilling system of claim 11, wherein the damping system further comprises a controller operatively connected to the gas spring and configured to adjust the spring coefficient in response to the one or more drilling parameters.

16. The drilling system of claim 15, wherein the controller is powered by energy that is harvested from the vibrations of the drill string.

17. The drilling system of claim 11, further comprising a piston having a first side in communication with the gas and a second side coupled with the mass.

18. The drilling system of claim 11, further comprising a vibration parameter measurement device in the drill string configured to measure a vibration parameter related to the vibrations of the drill string, wherein the one or more drilling parameters comprise the vibration parameter, the vibration parameter comprises a value selected from the group consisting of a frequency of the vibrations and an amplitude of the vibrations.

19. The drilling system of claim 11, wherein the mass is configured to move relative to the drill string in response to the vibrations in a direction that is transverse to the longitudinal axis of the drill string.

20. The drilling system of claim 11, wherein the gas spring comprises a gas and a controller configured to control a temperature of the gas.

* * * * *